(12) United States Patent
Bowen et al.

(10) Patent No.: US 8,967,887 B2
(45) Date of Patent: Mar. 3, 2015

(54) ENVIRONMENTALLY-SEALABLE PACKAGE FOR OPTICAL ASSEMBLY

(75) Inventors: Terry Patrick Bowen, Dillsburg, PA (US); Richard J. Perko, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 94 days.

(21) Appl. No.: 13/112,478

(22) Filed: May 20, 2011

(65) Prior Publication Data

US 2012/0294574 A1 Nov. 22, 2012

(51) Int. Cl.
*G02B 6/36* (2006.01)
*G02B 6/42* (2006.01)

(52) U.S. Cl.
CPC .............. *G02B 6/4251* (2013.01); *G02B 6/421* (2013.01); *G02B 6/423* (2013.01); *G02B 6/4281* (2013.01)
USPC ..................... 385/94; 385/88; 385/92; 385/93

(58) Field of Classification Search
CPC ... G02B 6/4248; G02B 6/4204; G02B 6/4251
USPC .................. 385/14, 76, 77, 88, 89, 92, 93, 94
See application file for complete search history.

(56) References Cited

U.S. PATENT DOCUMENTS

| | | | | |
|---|---|---|---|---|
| 5,450,515 | A * | 9/1995 | Bechtel et al. ................... | 385/94 |
| 5,537,504 | A * | 7/1996 | Cina et al. ....................... | 385/93 |
| 2002/0186934 | A1 | 12/2002 | Hug et al. | |
| 2003/0091820 | A1 | 5/2003 | Robbins | |
| 2004/0105627 | A1 * | 6/2004 | Hargis et al. .................... | 385/88 |
| 2005/0175299 | A1 * | 8/2005 | Hargis et al. .................... | 385/93 |
| 2006/0002667 | A1 * | 1/2006 | Aronson .......................... | 385/93 |
| 2006/0032665 | A1 * | 2/2006 | Ice .................................. | 174/254 |
| 2011/0317965 | A1 * | 12/2011 | Fujimura et al. ................ | 385/93 |

FOREIGN PATENT DOCUMENTS

| | | |
|---|---|---|
| DE | 2738401 A1 | 3/1978 |
| EP | 0661565 A1 | 7/1995 |

OTHER PUBLICATIONS

International Search Report, International Application No. PCT/US2012/034217, International Filing Date Apr. 19, 2012.
"Transmitter Component for 10.5 Gbps at 1310 nm with Receptacle and 50 Ohm Flexboard", Stier et al., obtained from 2004 Electronic Components and Technology Conference.

* cited by examiner

*Primary Examiner* — Kaveh Kianni
*Assistant Examiner* — Hung Lam

(57) ABSTRACT

Disclosed is a high speed flex circuit electronic interface in combination with a sealed optical connectorization approach for optical coupling. In a preferred embodiment, at a front end of the connector a wedge seal ring or "press ring" is pressed into the end of a slide tube, both of which are, in a preferred embodiment, made of metal such as stainless steel. The wedge end shape of the press ring in this preferred embodiment allows it to be easily pushed into the inside diameter of the slide tube, expanding the slide tube to create a radial surface seal maintained by the hoop stress developed in the slide tube initiated by the press ring, thereby creating a hermetic seal on a cylindrical portion of the flange assembly connector. A flex-circuit sealed back-end of the connector uses, in a preferred embodiment, polymer to polymer or polymer to metal bonding to create a hermetic seal on the back end.

8 Claims, 9 Drawing Sheets

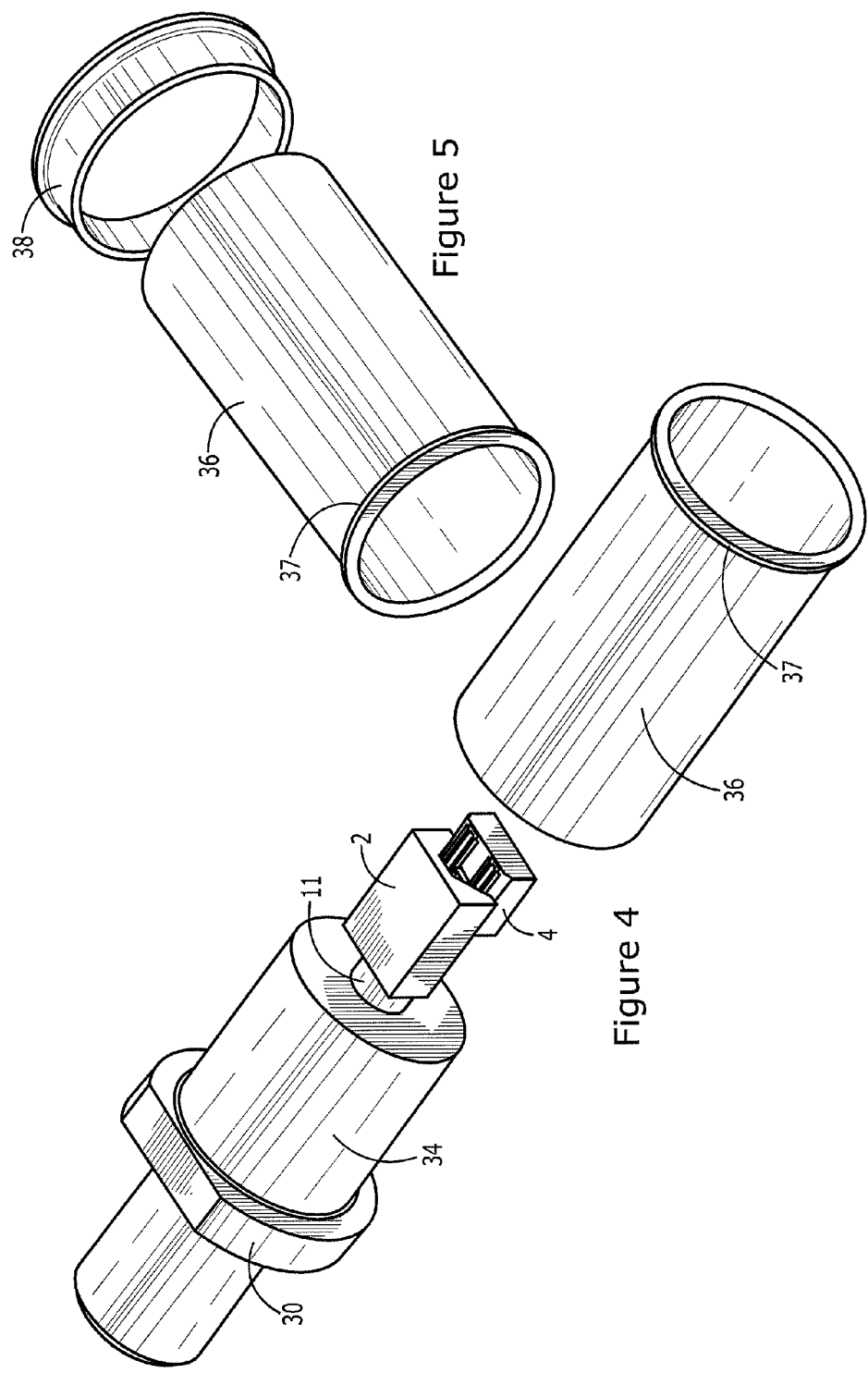

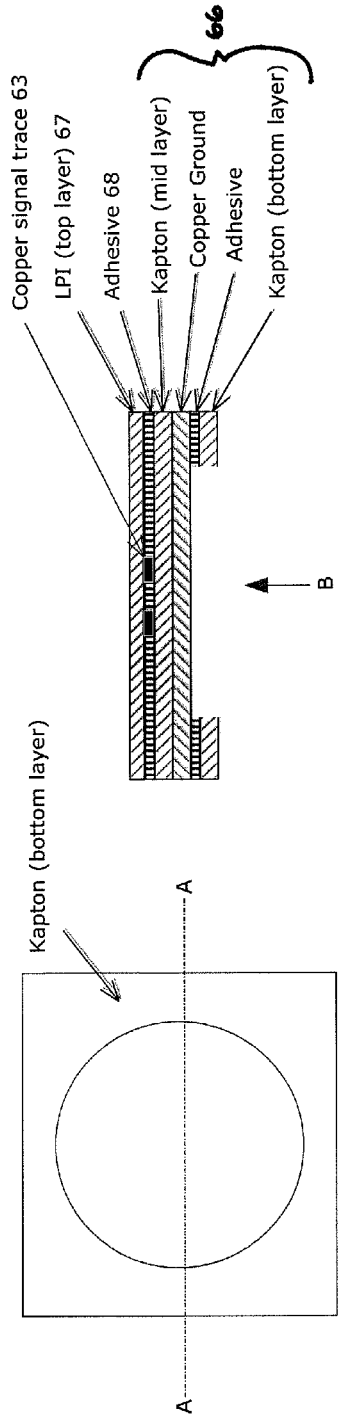
Figure 10A
Figure 10B
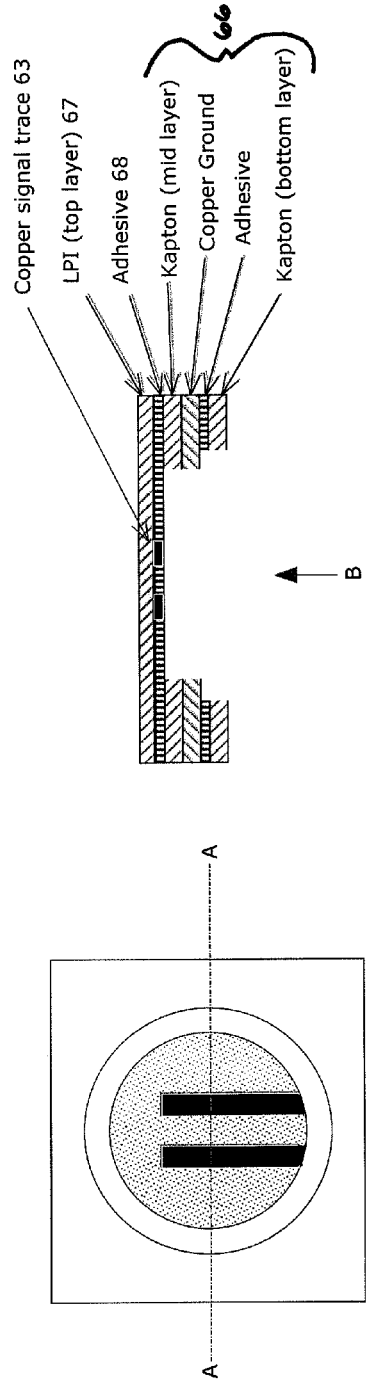
Figure 11A
Figure 11B

ENVIRONMENTALLY-SEALABLE PACKAGE FOR OPTICAL ASSEMBLY

FIELD OF INVENTION

This invention relates generally to an optical assembly, and, more specifically, to an environmentally sealed package for an optical assembly.

BACKGROUND

The use of optical fibers as a medium for transmission of digital data (including voice data) has become commonplace due to the high reliability and large bandwidth available with optical transmission systems. Fundamental to these systems are optical assemblies for transmitting/receiving optical signals and multiplexing/demultiplexing signals, frequently referred to generally as Opto-Electronic (OE) components.

In many applications OE component devices are subjected to harsh environments, such as water, high heat, extreme cold, high altitude, and the like. Typically, for reliable operation in such harsh environments, OE components are produced in hermetic enclosures which, using prior art technology, is quite costly. Further, many such devices require the ability to route electrical connection from outside the hermetic enclosure into the components within the hermetic enclosure. In prior art devices, hermetic electrical feed through approaches typically use an expensive ceramic or glass insulating material panels with glass/solder seals to the metal electrical conductor pins which penetrate openings in an insulating panel. These approaches are expensive and the conductor penetration arrangement must be carefully designed to impedance match both to the active elements within the package and to the ongoing circuit interconnect outside the package.

SUMMARY OF INVENTION

The claimed invention offers a high speed flex circuit electronic interface in combination with a sealed optical connectorization approach for optical coupling. In a preferred embodiment, at a front end of the connector a front end seal, e.g., a wedge seal ring or "press ring", is pressed into a front end of an enclosure member, e.g., a slide tube, both of which are, in a preferred embodiment, made of metal such as stainless steel. The wedge end shape of the press ring in a preferred embodiment allows it to be easily pushed into the inside diameter of the slide tube, expanding the slide tube to create a radial surface seal maintained by the hoop stress developed in the slide tube initiated by the press ring, thereby creating a hermetic seal on a cylindrical portion of the flange assembly connector. A back end seal member, e.g., a flex-circuit assembly uses, in a preferred embodiment, polymer to polymer or polymer-to-metal or metal-to-metal bonding to create a hermetic seal on a back end of the connector.

BRIEF DESCRIPTION OF DRAWINGS

FIG. 4 illustrates an aspect of a slide tube in accordance with an embodiment of the claimed invention;

FIG. 5 illustrates a press ring and slide tube in accordance with an embodiment of the claimed invention;

FIG. 10A depicts a bottom view of a one-pair portion of the multilayer flex circuit of FIG. 9; and FIG. 10B is a cross-sectional side view of the same one-pair portion taken along line A-A of FIG. 9, illustrating a first masking/etching step in accordance with an embodiment of the claimed invention;

FIGS. 11A and 11B illustrate a second masking/etching step in accordance with an embodiment of the claimed invention;

DETAILED DESCRIPTION

The claimed invention can be used to provide an environmentally sealed package for devices of any kind. An embodiment described herein is directed to providing a hermetic seal for optical components and more specifically to providing a hermetic seal for an optical bench constructed using the techniques and elements described in U.S. Pat. No. 7,511,258, the disclosure of which is incorporated fully herein by reference. It is understood that the present invention is not limited to creation of an environmentally sealed package for the optical bench of the '258 patent and the claimed invention should be construed to include environmentally sealing of devices of any kind. However, so as to more easily facilitate the explanation of an embodiment of the claimed invention, certain aspects of the '258 patent are described below; a more detailed description of the prior art is given in the '258 patent and does not need to be included herein to understand the claimed invention.

In the '258 patent, an optical mounting platform or optical "bench" is described, employing a platform having a V-groove which ensures passive alignment along the optical axis among the components mounted within the V-groove. The '258 patent describes the use of the V-groove to align substrate-type optical components (i.e., non-circular cross section) such as laser/optical detector assemblies, and provides for side features on the substrate-type optical component to allow it to mount reliably within the V-groove such that its optical axis is coaxial with those of the other optical components mounted in the V-groove.

Figure 1:
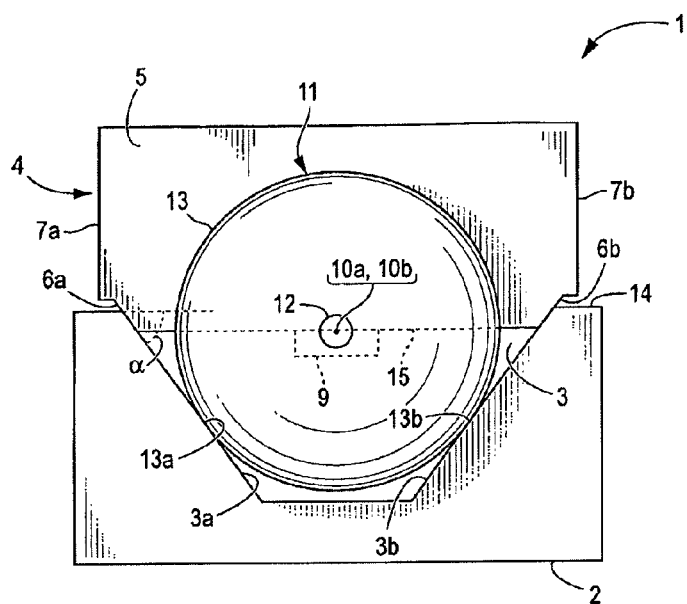
FIG. 1 is an axial view of a prior art optical assembly using a true position bench approach.
Figure 2:
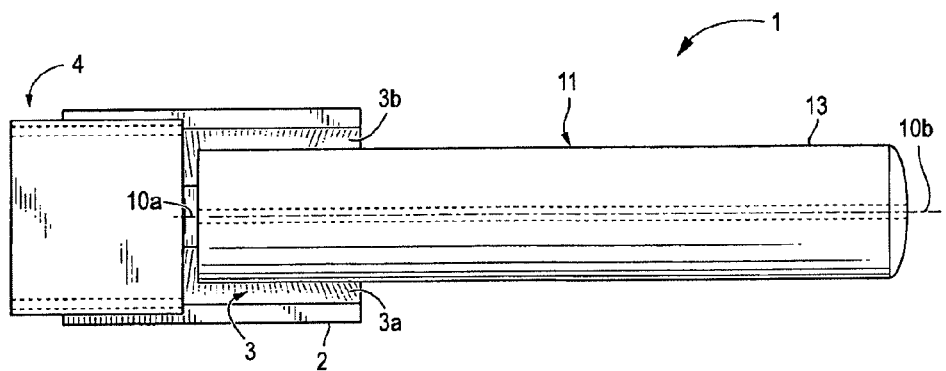
FIG. 2 is a top view of the prior art optical assembly of FIG. 1.

Referring to FIGS. 1 and 2, the general configuration of the prior art optical bench 1 of the '258 patent is described generally. In FIGS. 1 and 2, axial and top views, respectively, are shown of an optical assembly or "optical bench" 1 using an optical true position bench (TPB) approach. The optical bench 1 comprises a platform 2 for holding, in this example, first and second optical components 4, 11 in optical alignment.

The platform defines a V-groove 3 with walls 3a, 3b of a certain pitch α. A first optical component 4 is disposed in the V-groove 3. The first optical component 4 has a first optical axis 10a, a reference surface 15 and two sides 6a, 6b, each side is beveled at the certain pitch α outwardly from the reference surface 15. The first optical component 4 is disposed in the V-groove 3 such that the reference surface 15 faces downward with respect to the top surface 14 of platform 2 and the sides 6a, 6b of first optical component 4 are in parallel contact with the walls 3a, 3b, respectively, of the V-groove 3. A second optical component 11 is also disposed in the V-groove 3. The second optical component has a second optical axis 10b and an outer periphery 13 with at least two contact points 13a, 13b. The second optical component 11 is disposed in the V-groove such that the contact points 13a, 13b contact the walls 3a, 3b of the V-groove 3 and the second optical axis 10b is coaxial with the first axis 10a.

The platform 2 serves as the main foundation for the optical assembly. The first optical component 4 is a "substrate-type" optical component which refers to optical components which do not have a circular cross section (e.g., fibers and ferrules), but instead have a substantially planar substrate upon which one or more optical elements are attached. Examples of substrate-type optical elements include active laser/optical detector subassemblies which include the optical to electrical conversion devices along with the associated laser driver/transimpedance amplifier circuits for the transmitter/receiver electrical interface, or other active devices including modulators, switches and photonic integrated circuits (PICs), or other passive devices such as combiners, splitters, wavelength division multiplex (WDM)/de-multiplex devices, etc. These active types of elements, and combinations of active and passive types of elements typically require electrical connections (power, signal, etc). When creating an environmentally-sealed package, the issue of electrical connections becomes important since the connections themselves, and any exposed optical surfaces in the light path, must be insulated from moisture and other environmental conditions, and the pathway of the electrical connections from within the package to the exterior of the package must be able to protect the interior elements from the environmental conditions on the outside.

An embodiment of the claimed invention will now be described with reference to FIGS. 3-13. The drawing figures herein are not to scale and in many instances are exaggerated in size so that a better understanding of the claimed invention can be conveyed.

Figure 3:
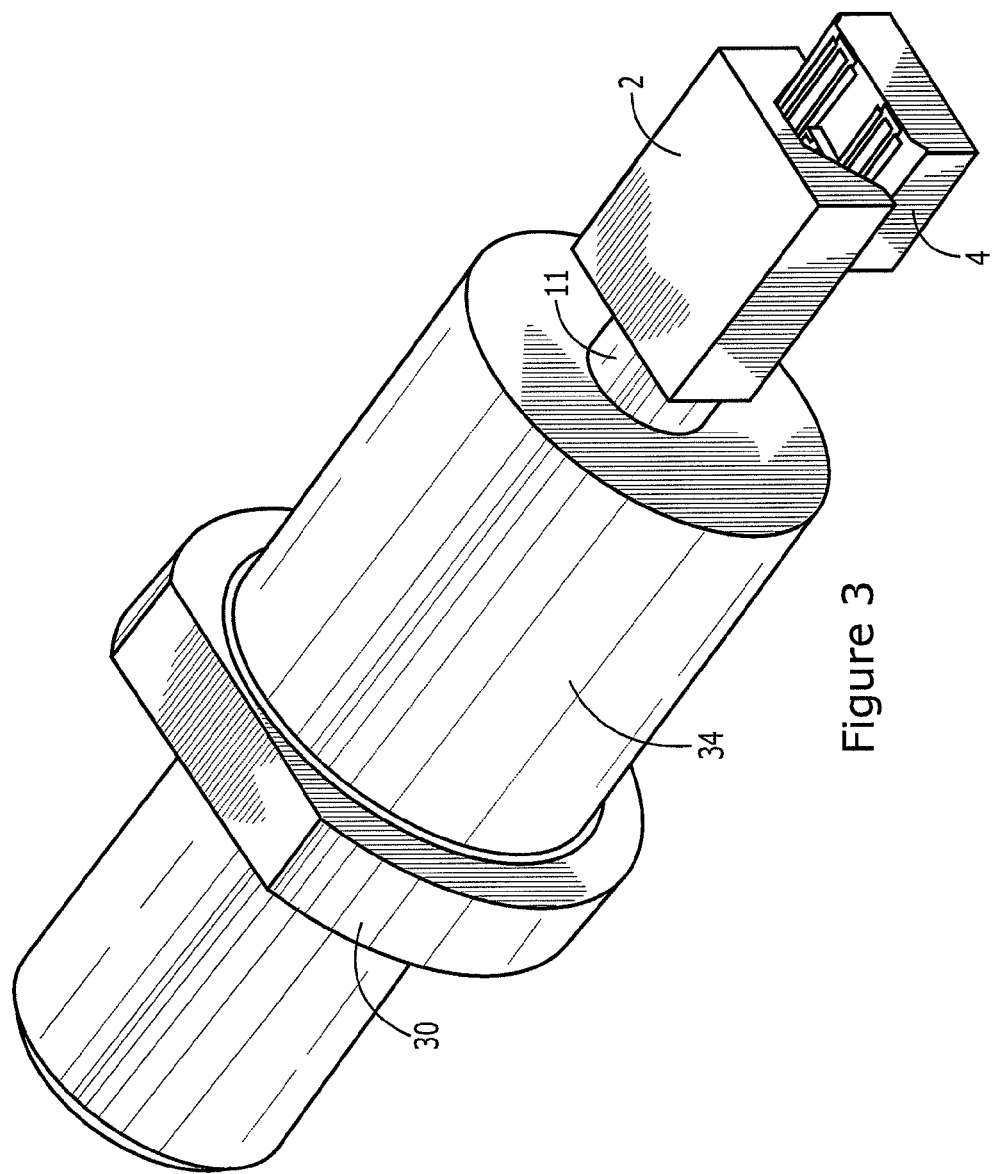
FIG. 3 illustrates an aspect of an optical bench coupled to a flange assembly in accordance with an embodiment of the claimed invention.

Referring to FIG. 3, an optical bench 1 such as the one described above is coupled to a flange assembly 30. Flange assembly 30 is, in a preferred embodiment, made of a metallic material such as stainless steel and has an opening along its longitudinal axis into which a ceramic ferrule 11 containing a fiber (not shown) is inserted in a well-known manner. In this example, the optical bench 1 includes an optical element 4, e.g., a silicon wafer, requiring electrical connectivity external to any container in which it is enclosed.

Flange assembly 30 includes a cylindrical portion 34 having a predetermined diameter that is larger than a diameter of ceramic ferrule 11, for the obvious reason that the ferrule 11 must pass through the flange assembly 30. Referring to FIG. 4, an enclosure member can comprise a slide tube 36 that is fabricated having an internal diameter that is larger than the outer diameter of cylindrical portion 34, so that it will fit slidingly but snugly onto the cylindrical portion 34 of flange assembly 30. For example, the cylindrical portion 34 can have an outer diameter of 3.65 mm and slide tube 36 can have an inner diameter of 3.9 mm. As will be described more fully below, slide tube 36 and flange assembly 30 cooperate with a front end seal member (not shown in FIG. 4) to enable a hermetic seal of the optical bench 1. Slide tube 36 includes an open front end and an open back end as shown.

FIG. 5 illustrates a front end seal member that can comprise a press ring 38 designed to fit slidingly on cylindrical portion 34 and snuggly within slide tube 36 when both are inserted onto cylindrical portion 34 of flange assembly 30. As can be seen in FIG. 5 and in subsequent FIGS. 6-8, in a preferred embodiment the mating ends of slide tube 36 and press ring 38 have corresponding beveled surfaces to help facilitate the snug insertion of press ring 38 into slide tube 36. The slide tube and press ring combination described above help to create a hermetic seal on a cylindrical portion (a front end) of the package, as will be described in more detail below. Slide tube 36 also includes a flange portion 37, the purpose of which is described in more detail below.

Figure 6:
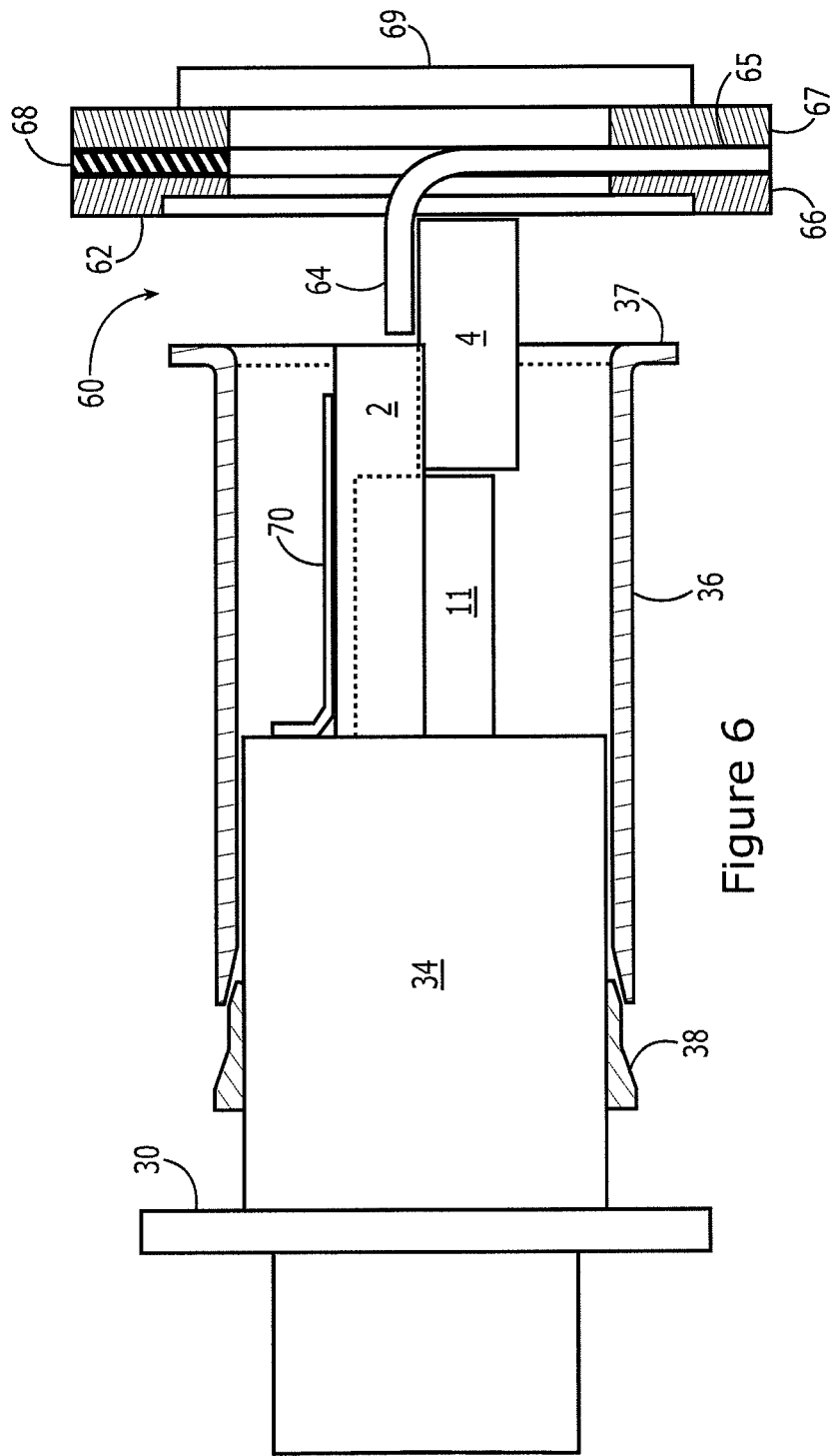
FIGS. 6-8 are partial cross-sectional views illustrating, in sequential order, an embodiment of steps and structure to create an environmentally sealed package in accordance with the claimed invention.
Figure 7:
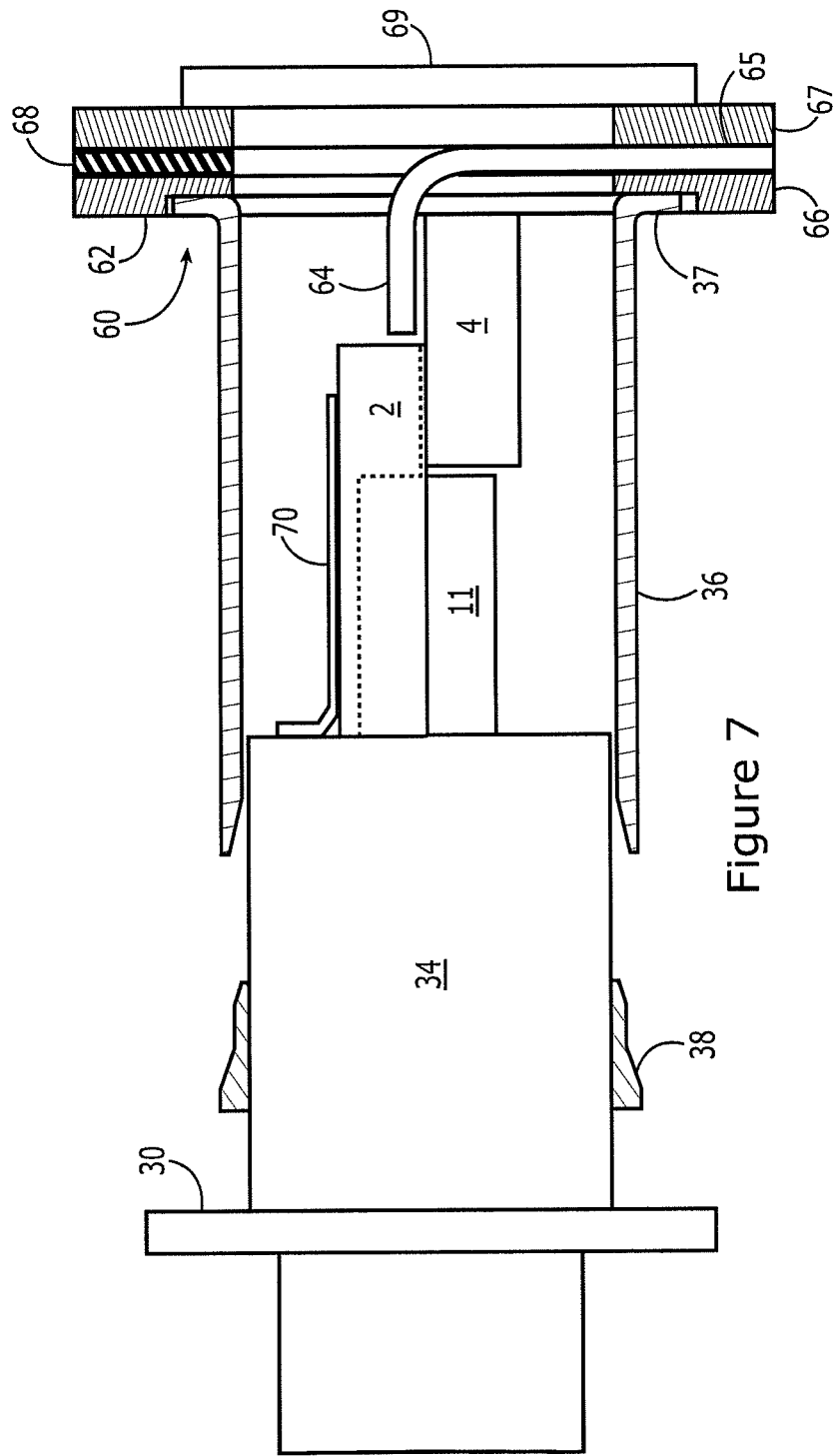
Figure 8:
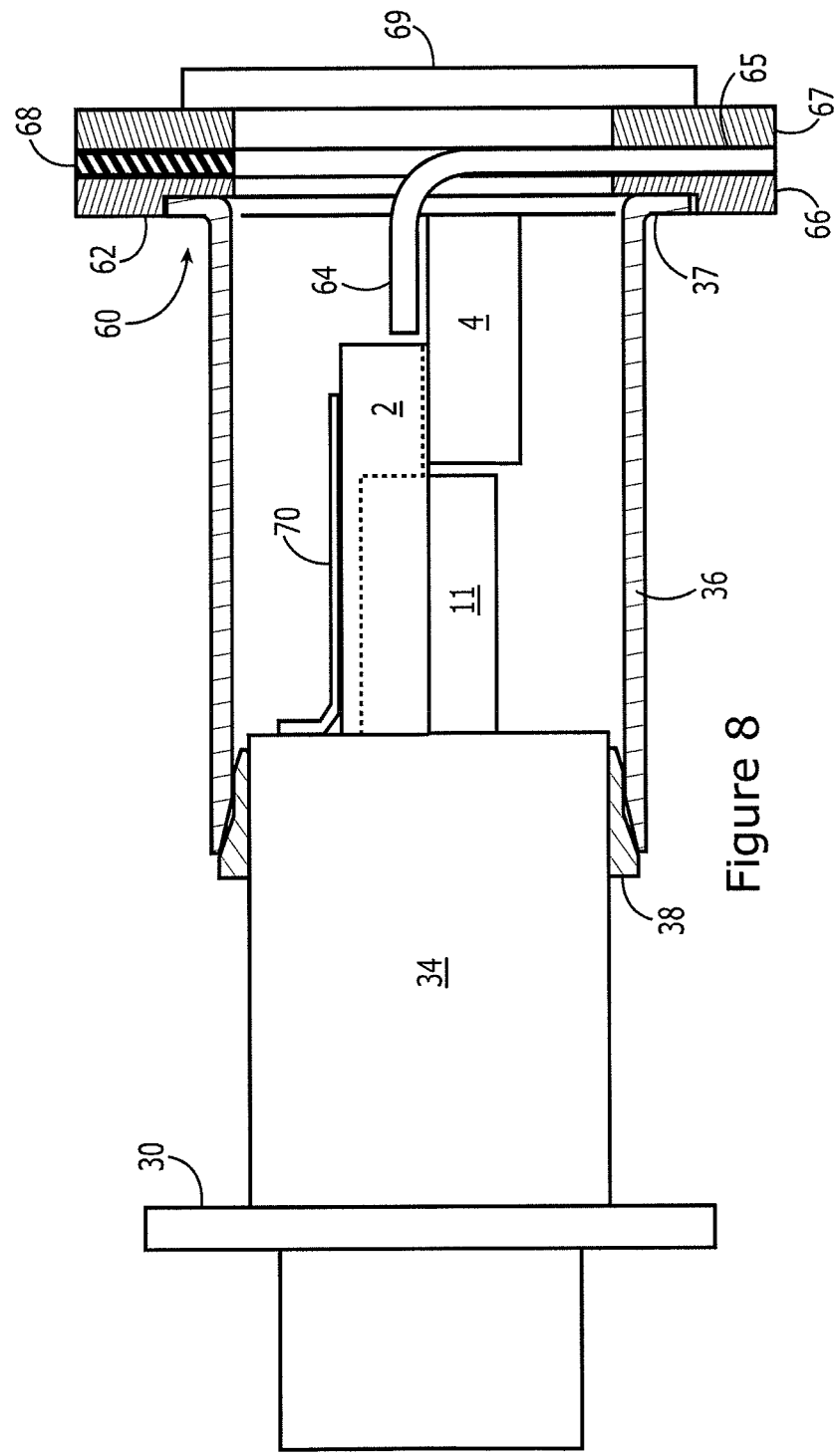

For a back end of the package, a hermetically-sealable back end seal member can comprise back end assembly 60, constructed as described in connection with FIGS. 6-13. FIGS. 6-8 are partial cross-sectional views illustrating, in sequential order, steps and structure to create an environmentally sealed package in accordance with an embodiment of the claimed invention. Referring to FIG. 6, hermetically-sealable backend assembly 60 is fabricated beginning with a multilayer flex circuit 62. Fabrication of multilayer flex circuits generally involves the sandwiching of multiple layers of copper between flexible dielectric material such as LPI (liquid photoimagable insulation) and/or LCP (liquid crystal polymer) materials and/or Kapton® as appropriate for the particular application for which the multilayer flex circuit will be used. (Details of the fabrication of a specific multi-layer flex circuit 62 according to this embodiment are provided below with reference to FIGS. 9-13.)

As can be seen in FIG. 6, first the press ring 38, and then the slide tube 36, are inserted onto the cylindrical portion 34 of flange assembly 30 as shown. As is apparent, the beveled portion of press ring 38 is positioned such that it is facing the beveled portion of slide tube 36. Hermetically-sealable backend assembly 60 is shown in its uncoupled state with respect to flange portion 37 of slide tube 36. Since slide tube 36 can be moved up and down the length of cylindrical portion 34 of flange assembly 30, a tongue portion 64 of a signal-carrying layer 63 can easily be electrically connected to optical element 4 while slide tube 36 is pushed out of the way as shown in FIG. 6. Any known technique for connecting tongue portion 64 to optical element 4 (e.g., chip-on-flex thermocompression bonding or solder bump bonding) can be utilized.

Referring to FIG. 7, once tongue portion 64 is electrically connected to optical element 4, slide tube 36 is pushed towards hermetically-sealable backend assembly 60 until flange portion 37 of slide tube 36 abuts a layer 66 of hermetically-sealable backend assembly 60 as shown. As will be more apparent after reading the detailed explanation of FIGS. 9-12, below, the flange portion 37 is "inset" into layer 66 so that it abuts a grounding layer, to provide grounding for the device. Any known means for hermetically coupling flange portion 37 of slide tube 36 to hermetically-sealable backend assembly 60 can be used, for example, solder bonding or laser welding. The signal carrying layer 63 is sandwiched between layer 66 and layer 67, hermetically sealing the electrical path to the internal elements of the optical connector from the outside environment. This hermetic connection allows the electrical connections to be made, hermetically, between the optical element 4 and the outside of the sealed package via a power/signal end 65 the signal-carrying layer 63, as will be explained more fully below.

Next, as shown in FIG. 8, the press ring 38 is moved down and driven into the end of slide tube 36 as shown. The wedge end shape of the press ring 38 in this preferred embodiment allows it to be pushed by assembly tooling into the inside diameter of the slide tube 36, expanding the slide tube 36 to create a radial surface seal maintained by the hoop stress on the slide tube 36 exerted by the press ring 38, thereby creating a hermetic seal onto the cylindrical portion 34 of the front end of the connector. Finally, the addition of a back end sealing plate 69 completes the hermetic sealing of the container and thus protects the contents inside (in this example, the optical shelf and everything mounted thereon) from outside elements.

In a preferred embodiment, a layer of thermal tape 70 or similar heat-conductive material can be formed on platform 2 (as shown, it is formed on the side of platform 2 opposite the V-groove 3) and bent so as to also contact flange assembly 30 as shown in any of FIGS. 6-8. This creates a thermal path from the platform 2 to the flange assembly 30, thereby creating a heat sink to draw heat away from the optical element 4 (which in many cases generates a considerable amount of heat). If, for example, the optical element 4 is formed on a silicon wafer, the silicon wafer can transfer the heat from the optical element to the platform 2, which in turn can transfer the heat along the thermal tape 70 to the flange assembly 30.

Figures 9A, 9B:
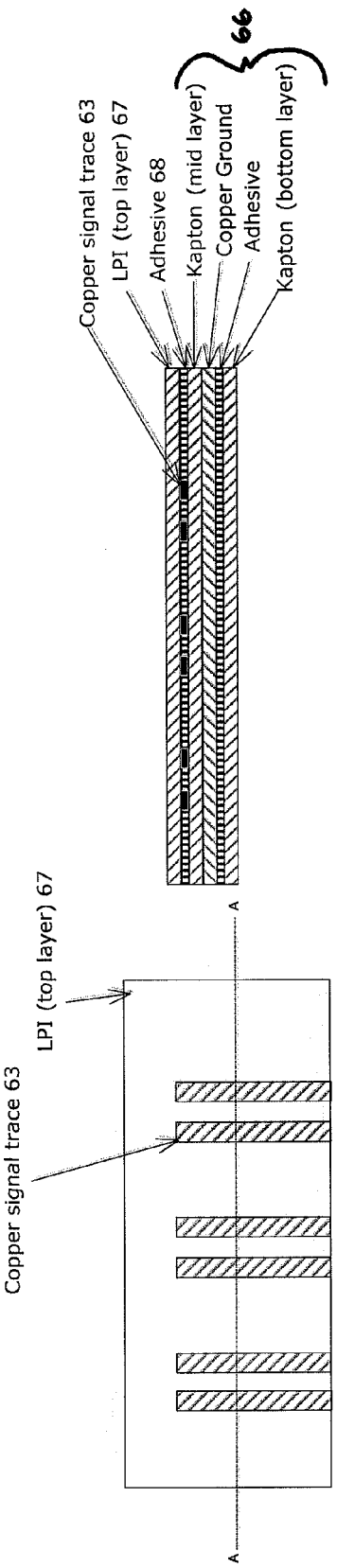
FIG. 9 depicts a multi-layer flex circuit according to an embodiment of the claimed invention.
Figure 12B:
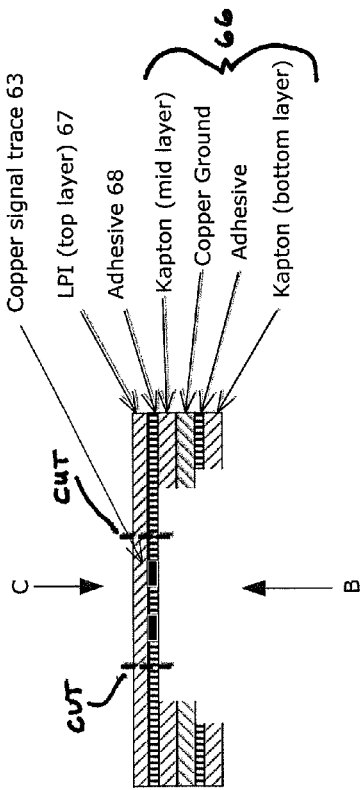
FIGS. 12A and 12B depict a cutting step in accordance with an embodiment of the claimed invention.
Figure 12A:
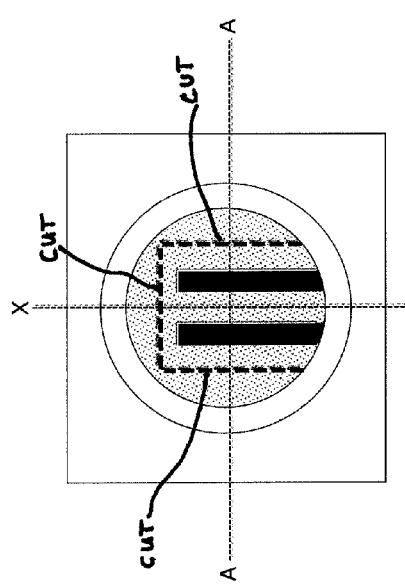

In a preferred embodiment, as mentioned above, multilayer flex circuit 62 is fabricated by starting with a multi-layer stackup as shown in FIG. 9. In the example shown in FIG. 9, the multilayer stack-up comprises, from bottom layer to top layer, a bottom layer of high-temperature polyimide film, e.g., Kapton®, a layer of adhesive, a copper ground layer, a high-temperature polyimide-film mid-layer, pairs (3 shown) of copper signal traces on or co-existent with an adhesive layer, followed by a top layer of LPI. It is understood that this initial configuration of the stack-up is given for example only and numerous variations of the initial stack-up will be apparent to a person of ordinary skill in the art, and such variations are considered to be encompassed in the appended claims. The resultant multilayer flex circuit provides flex-circuit "stock" material from which sections, each containing a single pair of copper signal traces, can be cut and used. In the example of FIG. 9, three such sections can be cut. As used herein, the term "high-temperature polyimide film" means any polyimide film capable of withstanding soldering temperatures in the range of 200-300° C., and preferably in the range of 240-250° C.

As can be seen in the top view of FIG. 9, the pairs of copper signal traces (shown visibly for purpose of explanation, but which would not actually be viewable through the LPI top layer unless it were transparent) terminate within the width of the flex circuit. As discussed in more detail below, the ends of the copper signal traces will eventually provide solder points for connection to the optical element 4.

FIGS. 10A-10B, 11A-11B, and 12A-12B are bottom and cross-sectional side views showing a single-pair section of multilayer flex-circuit 62 and illustrating masking/etching steps that result in the flex-circuit portion of hermetically-sealable backend assembly 60. Referring now to FIGS. 10A and 10B, a bottom view of a one-pair portion of the multilayer flex circuit of FIG. 9 is shown in FIG. 10A, and FIG. 10B is a cross-sectional side view of the same one-pair portion taken along line A-A of FIG. 9. The bottom view of FIG. 10A corresponds to a view taken from arrow B of FIG. 10B.

To create the hermetically-sealable backend assembly 60, as shown in FIGS. 10A and 10B, the Kapton® bottom layer and adjacent layer of adhesive are removed in the shape of a circle, as shown, using known masking and etching techniques. The size of the circle removed is selected so as to expose the copper ground layer and provide a grounding and mounting surface for connection to the flange portion 37 of slide tube 36, as described above in connection with FIG. 8.

Figure 13:
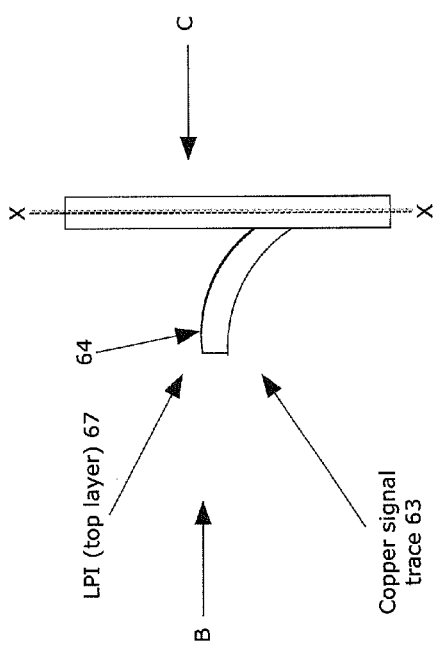
FIG. 13 is a side view of FIG. 12A pivoted 90 degrees along axis X-X.

Next, as shown in FIGS. 11A and 11B, known masking and etching techniques are used to remove a smaller circle-shaped portion of the exposed copper ground layer and the Kapton® mid-layer beneath it, to thereby expose the copper signal trace pair. Next, as illustrated by dotted lines in FIGS. 12A and 12B, three cuts are made through the adhesive layer adjacent to the copper signal trace pair and through the LPI top layer, thereby creating tongue portion 64. Finally, as shown in FIG. 13 (a side view of FIG. 12A pivoted 90 degrees), the tongue portion 64 is pushed in direction C to thereby place the copper signal traces in position for fastening to optical element 4 as shown above with respect to FIGS. 6-8.

The end result of the above described masking, etching, and cutting steps is the fabrication of a "sandwich" having a tongue 64 with a pair of exposed copper signal traces that are affixable to optical element 4 as shown, for example, in FIGS. 6-8.

To provide electrical connectivity to the copper signal traces 63 and thus to the optical element 4 to which it is connected, referring back to FIG. 8, the end portion of layer 67, which comprises the LPI top layer and the copper signal traces, can be subjected to etching techniques to remove the LPI layer of layer 67 and thereby expose the power/signal end 65 of copper signal traces 63 to the outside environment, and thus allow them to be connected to an electrical power source or other electrical connections. While this etched portion is not shown in the Figures, it will be apparent to an artisan of ordinary skill how to etch away the needed area of layer 67 to expose the power/signal end 65 of copper signal traces 63. Finally, the addition of a back end sealing plate 69 completes the hermetic sealing of the container and this protects the contents inside (in this example, the optical shelf and everything mounted thereon) from outside elements, as shown in FIGS. 6-8.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. An optical package environmentally-sealing an optoelectronic component inside the optical package from an environment outside of said optical package, comprising:
   an enclosure member having an open back end including an open front end, and further comprising:
   a flange assembly which includes a cylindrical portion, through which a ferrule passes, having an outside diameter;
   a front end seal member; and
   a back end seal member including a flex circuit attached directly to said optoelectronic component;
   wherein said enclosure member comprises a slide tube having an inside diameter larger than said outside diameter, said slide tube slidingly fitting on said cylindrical portion; and
   wherein said front end seal member is coupled to said flange assembly and to said enclosure member, thereby environmentally-sealing said optoelectronic component by closing said open front end; and
   wherein said optoelectronic component is placed within said enclosure member and said back end is sealed with said back end seal member, thereby environmentally-sealing, inside of the optical package, the direct connection between the flex circuit and the optoelectronic component from the outside of the optical package with respect to said open back end, and wherein said flex circuit enables electrical connectivity between said optoelectronic component and said outside environment.

2. The optical package of claim 1, wherein said front end seal member comprises a press ring having an inside diameter approximately equal to the inside diameter of said slide tube and an outside diameter of a size enabling it to be snugly pressed inside slide tube.

3. The optical package of claim 2, wherein said press ring has a beveled edge to facilitate its insertion into said slide tube.

4. The optical package of claim 1, wherein said back end seal member comprises a flex circuit assembly, said flex circuit assembly comprises a multilayer flex circuit having electrically-conductive paths formed therein, said multilayer flex circuit having a tongue portion electrically connected to said optoelectronic component, and a power/signal end providing electrical connectivity to said electrically-conductive paths from said environment external to said optical package.

5. The optical package of claim 2 wherein said back end seal member comprises a flex circuit assembly, said flex circuit assembly comprises a multilayer flex circuit having electrically-conductive paths formed therein, said multilayer flex circuit having a tongue portion electrically connected to said optoelectronic component, and a power/signal end providing electrical connectivity to said electrically-conductive paths from said environment external to said optical package.

6. The optical package of claim 4, wherein said multilayer flex circuit comprises:
   a first layer of flexible dielectric material;
   a first adhesive layer formed on said first layer of flexible dielectric material;
   a copper ground layer formed on said first adhesive layer;
   a second layer of flexible dielectric material formed on said copper ground layer;
   a second adhesive layer formed on said second layer of flexible dielectric material;
   a pair of copper signal traces formed on said second adhesive layer; and
   a third layer of flexible dielectric material formed on said pair of copper signal traces.

7. The optical package of claim 6, wherein said flexible dielectric material comprises high temperature polyimide film.

8. The optical package of claim 6, wherein said flexible dielectric material comprises any of liquid photoimagable insulation, liquid crystal polymer, and Kapton®.

\* \* \* \* \*